United States Patent
Schmidt et al.

(10) Patent No.: US 11,288,567 B2
(45) Date of Patent: Mar. 29, 2022

(54) METHOD FOR TRAINING DEEP NEURAL NETWORK (DNN) USING AUXILIARY REGRESSION TARGETS

(71) Applicant: NEC Laboratories Europe GmbH, Heidelberg (DE)

(72) Inventors: Mischa Schmidt, Heidelberg (DE); Tobias Jacobs, Mannheim (DE)

(73) Assignee: NEC CORPORATION, Tokyo (JP)

( * ) Notice: Subject to any disclaimer, the term of this patent is extended or adjusted under 35 U.S.C. 154(b) by 686 days.

(21) Appl. No.: 16/194,413

(22) Filed: Nov. 19, 2018

(65) Prior Publication Data

US 2020/0074273 A1 Mar. 5, 2020

Related U.S. Application Data

(60) Provisional application No. 62/726,449, filed on Sep. 4, 2018.

(51) Int. Cl.
*G06N 3/04* (2006.01)
*G06N 3/08* (2006.01)

(52) U.S. Cl.
CPC ......... *G06N 3/0409* (2013.01); *G06N 3/0454* (2013.01); *G06N 3/082* (2013.01)

(58) Field of Classification Search
CPC ..... G06N 3/0409; G06N 3/0454; G06N 3/082
USPC .......................................................... 706/12
See application file for complete search history.

(56) References Cited

U.S. PATENT DOCUMENTS

| | | | |
|---|---|---|---|
| 2018/0012006 A1* | 1/2018 | Suh | G06F 21/32 |
| 2018/0144246 A1* | 5/2018 | Jayadeva | G06N 3/0454 |
| 2019/0361454 A1* | 11/2019 | Zeng | B60W 50/0098 |
| 2019/0391038 A1* | 12/2019 | Kitai | G05B 23/0235 |

* cited by examiner

*Primary Examiner* — Tsu-Chang Lee
(74) *Attorney, Agent, or Firm* — Leydig, Voit & Mayer, Ltd.

(57) ABSTRACT

A method for training a machine learning model includes calculating auxiliary regression targets (ARTs) for a training data set, modifying an input neural network architecture to provide a modified neural network architecture that includes a parallel neural network layer stack for regressing the ARTs, and training the modified neural network architecture on the ARTs in addition to original machine learning problem targets for the training data set.

15 Claims, 3 Drawing Sheets

METHOD FOR TRAINING DEEP NEURAL NETWORK (DNN) USING AUXILIARY REGRESSION TARGETS

CROSS REFERENCE TO RELATED APPLICATIONS

This application claims benefit to U.S. Provisional Patent Application No. 62/726,449, filed Sep. 4, 2018, which is hereby incorporated by reference herein.

FIELD

The present invention is related to machine learning, and in particular, to training neural networks using the process of supervised learning.

BACKGROUND

The process of using supervised learning to train deep neural networks (DNN) to solve a given problem (e.g. image classification) typically consists of 3 high-level steps. In a first step, a human expert designer or an algorithm designs a DNN architecture and chooses hyper-parameters and an optimization algorithm for training the architecture to solve the problem. The DNN architecture specify, e.g., a number of hidden layers, a number of neurons per layer, and connections between neurons of different layers. The hyper-parameters can include, e.g., a learning rate, a heuristic for initializing DNN connection weights, and a dropout fraction per layer. The optimization algorithm can be, e.g., a gradient descent algorithm such as a stochastic gradient descent. In addition, the first step further includes initializing the DNN connection weights, typically at random. The DNN connection weights express a strength of the influence that neuron of a lower layer has on the neurons of a higher level that it connects to. The DNN connection weights can also be referred to as parameters of the DNN.

In a second step, the optimizer iteratively updates the DNN connection weights by using the optimization algorithm to minimize an error function on a training dataset. The specific error function that is minimized depends on the learning problem (e.g. cross-entropy for classification problems). The optimizer considers every sample in the training dataset during an "epoch" and updates the parameters at the end of the epoch (in the case of "batch" training) or after considering each individual sample (in the case of "online" training). Typically, multiple epochs of training are performed. The amount of time required for each epoch of training depends on available computing resources, the DNN architecture, the optimization algorithm, and the training dataset.

In a third step, the trained DNN is evaluated using a test dataset in order to analyze the capability of the DNN to generalize to previously unconsidered data.

During DNN training, each of the three steps can be tweaked and altered. Typically, the three steps are performed for each of multiple different DNN architectures before a final DNN architecture is selected for solving the given problem.

SUMMARY

In an embodiment, the present invention provides a method for training a machine learning model. The method includes calculating auxiliary regression targets (ARTs) for a training data set, modifying an input neural network architecture to provide a modified neural network architecture that includes a parallel neural network layer stack for regressing the ARTs, and training the modified neural network architecture on the ARTs in addition to original machine learning problem targets for the training data set.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
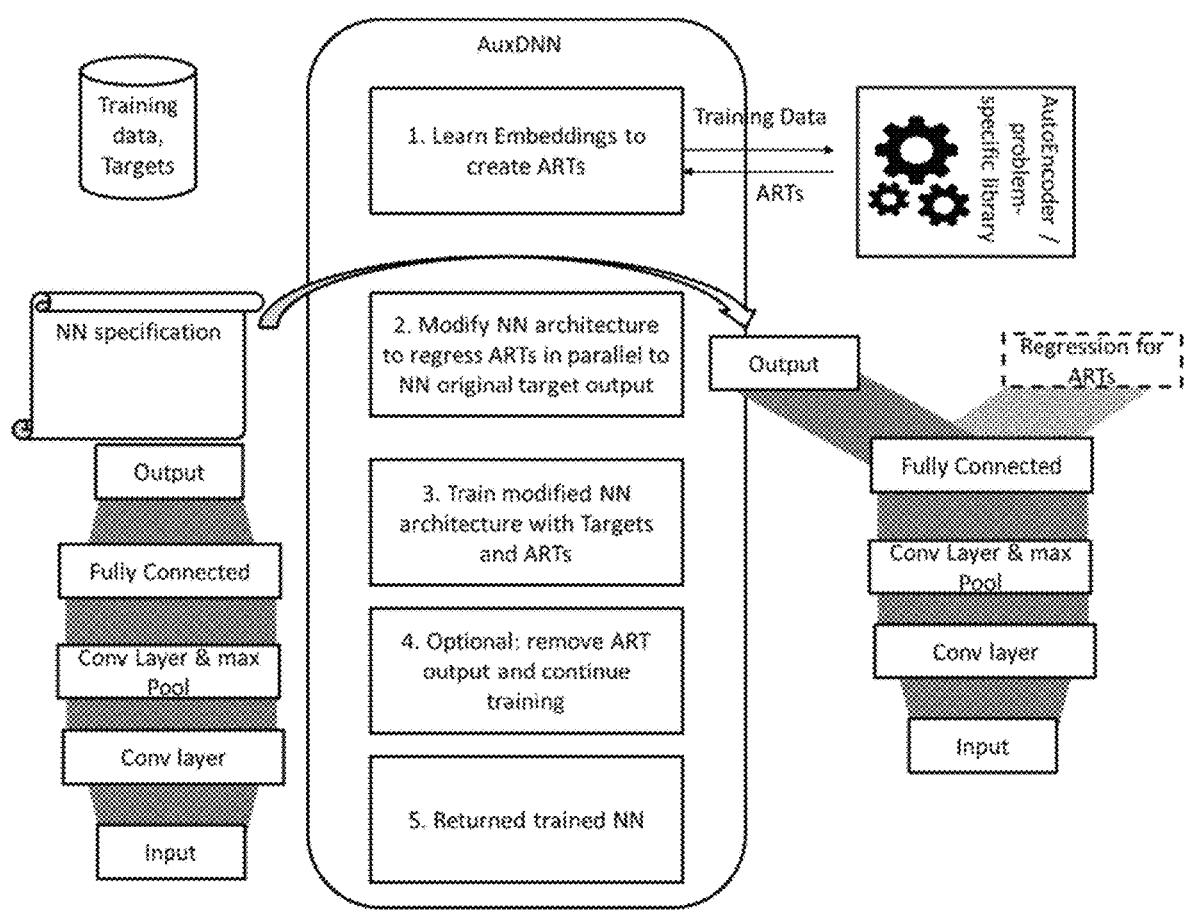
FIG. 1 shows an example of an original and a modified NN architecture.

Embodiments of the present invention provide systems and methods for improving the supervised learning process by which deep neural networks (DNNs) can be trained. Specifically, embodiments of the present invention provide systems and methods by which the iterative adaptation of the parameters of a DNN architecture, which is performed in order to minimize an error function on a training dataset, can be improved. According to embodiments of the invention, higher accuracy in early training epochs can be realized—both on the training dataset and on a test dataset.

According to embodiments of the invention, an Auxiliary Dense Neural Network (AuxDNN) component is provided that modifies an originally defined NN architecture and that constructs auxiliary regression target (ART) output in order to improve the NN training based on additional features.

According to embodiments of the invention, the AuxDNN component receives, as input, a neural network (NN) architecture for a supervised or semi-supervised machine learning (ML) task. The supervised or semi-supervised ML task can be, e.g., an ML task specified in the keras deep learning library (http://keras.io). The NN architecture can be specified by a human designer or can be specified by an algorithm. The NN architecture received by the AuxDNN component as input is denoted the "original NN architecture." The original NN architecture can be, e.g., a deep neural network (DNN) that supports a variety of advanced layers, neuron activations, and regularization techniques known from the state of the art in deep learning. A maximum number of epochs for training the NN architecture can be specified by the designer, whether human or algorithmic.

The AuxDNN component can, according to certain embodiments, further receive, as input, a machine learning problem specification. The machine learning problem specification can, for example, follow the format used by openML (www.openml.org).

The AuxDNN component can also, according to certain embodiments, identify types of data to be provided to the NN architecture as input. For example, if the problem to be solved by the DNN is an image classification problem, the AuxDNN can identify that the types of data to be provided to the NN architecture as input are images, or more specifically, pixel data of images. In such embodiments, the AuxDNN component can then access a suitable processing library to generate known features of such types of data. For example, where the types of data to be provided to the NN architecture as input are images, the AuxDNN component can access one or more image processing libraries in order to determine known features of images. These features generated by the AuxDNN component will serve as auxiliary regression targets (ARTs). In a beneficial variant, the AuxDNN can learn an embedding derived from such known features, e.g. by k-means clustering, Autoencoders, Binary Spatter Codes or simple superpositioning of the feature vectors. Each sample from the training dataset can then be associated with a representation in the embedding. These embeddings associated with the training can serve as auxiliary regression targets (ARTs) in addition to, or instead of using the known features themselves as ARTs.

When ARTs are represented as a vector, each dimension thereof can be standardized for computational reasons to, e.g., zero mean and unit variance.

After receiving the NN architecture as input, the AuxDNN selects a layer of the NN architecture and connects, on top of the selected layer, a branch of stacked additional NN layers. The branch of stacked additional NN layers runs in parallel to the layers of the original NN architecture above the selected layer. Therefore, the branch of stacked additional NN layers, i.e. the parallel NN layer stack, and the layers of the original NN architecture above the selected layer both receive input from the layers of the NN below the selected layer. The output layer of the parallel NN layer stack is a layer that aims to regress the ARTs, and therefore, must match the dimensionality of the ARTs themselves. In order to regress the ARTs, standard loss functions for supervised regression problems can be used.

The output of the parallel NN layer stack is also referred to as "auxiliary regression output" or "ART output" in the following. The parallel NN layer stack output layer is interpreted as a vector. For input data samples the target is to match the associated ART (i.e. the known features or the associated embedding) as closely as possible. This architecture is denoted "modified architecture." For example: for a specific input image x with class label y, the associated additional features f and the learned embedding e, the DNN attempts to minimize the classification error between y' and y, at the same time as minimizing the error between e' and e. Here e' and y' denote the DNN outputs (y' the predicted class label, e' the output of the parallel NN layer stack).

According to certain embodiments of the invention, the selected layer of the NN architecture is the penultimate layer prior to the output layer of the original NN architecture.

According to an embodiment of the invention, a method is provided for training a machine learning model. The method includes calculating auxiliary regression targets (ARTs) for a training data set, modifying an input neural network architecture to provide a modified neural network architecture that includes a parallel neural network layer stack for regressing the ARTs, and training the modified neural network architecture on the additionally regressed ARTs in addition to original machine learning problem targets for the training data set. According to an embodiment, the method further includes providing the training dataset. The training dataset can include a plurality of individual input data samples and targets associated with the individual input data samples. Calculating the ARTs for the training data set can include identifying features of the individual input data samples, generating a feature vector for each of the identified features, constructing a feature space from the generated feature vectors, and generating, for each respective individual input data sample, a corresponding vector in the feature space that serves as an ART associated with the respective individual input data sample.

The input neural network architecture can provide a first output corresponding to the targets associated with the individual input data samples. The parallel neural network layer stack can provide a second output corresponding to the ARTs such that the modified neural network layer architecture provides the first output and the second output. Training the modified neural network architecture on the additionally regressed ARTs in addition to original machine learning problem targets for the training data set can include updating weights assigned to the modified neural network so as to minimize an error function. The error function can include a first component that measures an error related to the first output and a second component that measures an error related to the second output. The error function can further include a first weight associated with the first component and a second weight associated with the second component. Training the modified neural network architecture on the additionally regressed ARTs in addition to original machine learning problem targets for the training data set can further include adjusting the first weight and the second weight.

According to an embodiment, the method can further include specifying, for the input neural network, a number of hidden layers, a number of neurons per layer, and/or connections between neurons of different layers. In addition, the method can further include specifying, for the input neural network, a plurality of hyperparameters that include one or more of a learning rate, a heuristic for initializing neural network connection weights, and a dropout fraction per layer. According to an embodiment, the individual input data samples are individual images, and the targets associated with the individual input data samples are class labels.

According to an embodiment of the invention, a non-transitory computer readable medium is provided having stored thereon instructions for performing a method for training a machine learning model. The method includes calculating auxiliary regression targets (ARTs) for a training data set, modifying an input neural network architecture to provide a modified neural network architecture that includes a parallel neural network layer stack for regressing the ARTs, and training the modified neural network architecture on the additionally regressed ARTs in addition to original machine learning problem targets for the training data set.

FIG. 1 shows an example of an original NN architecture and a modified NN architecture. As can be seen in FIG. 1, the modified NN architecture includes the entirety of the original NN architecture and a parallel NN layer stack that learns to regress the ARTs as described above.

According to one or more embodiments of the invention, the modified architecture can be trained as follows. Suitable loss functions for the auxiliary regression output are, e.g., the known mean absolute error (MAE) or the mean squared error (MSE) metrics between an ART (interpreted as a vector) corresponding to the additional known features computed for the input data. To specify clearly: the modified NN architecture provides two outputs per input data sample x: an "original output" that corresponds to an output of the original NN architecture (e.g. the class label for classification problems) and an "ART output" vector that shall be as close as possible to the ART. There is no limitation on the number of NN layers used to form the parallel NN layer stack of the modified NN architecture.

According to one or more embodiments, the loss associated to errors of the modified NN architecture's ART output and the loss associated to the original output can be assigned weights to indicate the importance of one loss relative to the other.

According to an embodiment, the modified architecture is such that the output layer of the parallel NN layer stack is a linear layer.

One or more embodiments of the invention modify the training dataset and configure the NN architecture (or the optimizer, depending on the programming framework) such that, during learning, the NN will be provided with samples from the training dataset, corresponding original target data (e.g. regression targets or class labels, depending on the ML problem specification), and additionally the ARTs associated to the training samples. Then, the invention applies the optimizer to train the modified NN architecture on the modified training data set for a predefined number of epochs.

One or more embodiments of the invention reduce the importance weight of the loss of the ART output as the training advances. For example, the importance weight might be set to 0 after half the maximum number of training epochs have passed. In one or more embodiments, a linear decrease of the weight (from equal weight to the original network output to 0 over the maximum number of training epochs) is applied during each epoch.

As the regressing the ARTs can be seen as a kind of regularization to the NN learning, one or more embodiments of the invention track the training set loss or error of the original output as the training epochs advance. When improvements in a series of epochs stagnate, the relative importance of the ART output loss can be reduced (or alternatively the importance of the original output loss can be increased).

As the relative importance of the ART output loss is reduced to 0, one or more embodiments of the invention undo the modifications to the original NN architecture (delete the parallel NN layer stack that was introduced) and continue training with the original training data set (without ARTs). AuxDNN then may continue training or directly return the NN.

After training is completed (due to stagnating training error or due to reaching a maximum number of training epochs), one or more embodiments of the invention remove the introduced modifications by deleting the parallel NN layer stack. In this way, a trained NN reflecting the originally specified architecture can be returned to the designer.

One or more embodiments of the invention do not undo the modifications applied to the original NN architecture (neither when the ART loss' relative importance reaches 0, nor when training finishes) and return the trained modified NN. Optionally the embeddings learned and the parameters to reverse the embedding procedure to obtain the features can be returned. This has the benefit that when a data sample is provided as input to the trained NN, it will perform its original task (e.g. classification or regression) via the original output and also approximate the ARTs as a by-product without requiring another algorithm to calculate the relevant features or their embeddings.

In general, it is easily possible to generate embodiments of AuxDNN that add one or more ART stacks (with different variants of the features to be regressed) to the original NN architecture at varying times during the NN training procedure—e.g. at the first training epoch, after a fixed number of epochs, or dynamically decided based on, e.g., metrics observed during the NN training. Clearly, removal of one or more ART stacks at different times or due to observed metrics during the training can be employed by various embodiments of the invention.

According to one or more embodiments, images are the input data type. In such embodiments, the known openCV library (https://opencv.org/) can be used to generate features. Suitable algorithms provided by openCV for generating features of images include, e.g., SIFT (Scale-invariant feature transform), SURF (Speeded Up Robust Features), and ORB (Oriented FAST (Features from accelerated segment test) and rotated BRIEF (Binary Robust Independent Elementary Features)). Embodiments of the invention may run such algorithm(s) multiple times with different configurations such that the image features produced by openCV are satisfactory (e.g. in a statistical sense), e.g. such that no training image has an empty list of features.

One or more embodiments of the invention that are beneficial for image classification learn an embedding of the generated features, e.g. by k-means clustering as provided by openCV, Autoencoders, Binary Spatter Codes or simple superpositioning. Then, each training set image is associated to the embedding corresponding to its generated features and the associated image serves as an auxiliary regression target for NN training (in addition to the image's class label) as described above.

FIG. 1 illustrates an embodiment of the invention. AuxDNN is provided with training data and targets. The targets can include, e.g., class labels or regression targets. AuxDNN learns an embedding, e.g., by applying an Auto-Encoder or by applying a library (e.g. openCV for images) as described above to the training data before training. Algorithms 1 and 2 below provide examples of learning an embedding. For each training image, its corresponding embedding serves as an ART. In other words, each image in the training dataset is associated with a corresponding embedding vector that the modified NN architecture attempts to learn in addition to learning to predict the training data targets. For example, the "visual bag of words" approach known from the image classification literature can be described to derive the ARTs. Applying the SIFT algorithm with default parameters will identify a set of key points in each training image. For a single image, each key point is characterized by a SIFT feature descriptor, a binary vector of configurable dimensionality, e.g. 256. Applying the k-means clustering algorithm to the entirety of SIFT features generated for the training set results in k mutually exclusive clusters (k is often set to 1000 or 2000), representing visual concepts or "words." Then, each training image is associated to the set of clusters its feature descriptors map to. One way to do so is by associating to each image a vector of dimensionality k (where the index of the vector's dimensions map to clusters' indices) that counts how often the image's features mapped to the respective clusters. These vectors serve as ART vectors and represent the learned embeddings. The dimensionality of the single ART vectors corresponding to the training data samples defines the dimensionality of the ART output that the AuxDNN will connect to the original NN architecture specified, e.g., by a human designer, by an autoML algorithm, or by NN architecture search approaches in the state of the art. The original layers and weights of the NN architecture are illustrated exemplarily in the figure. The NN's original weight matrices are by the dark checker-board pattern between layers. The additional ART output layer and the corresponding additional weight matrix are illustrated by the dashed box and the wave pattern.

The AuxDNN then trains the modified NN with the training input data, the training data targets and the ARTs. The length of training may be dynamically decided (e.g. based on progress in reducing training or validation errors), or based on a fixed number of epochs. After this training of the modified NN, the AuxDNN may optionally continue training the NN (either by removing the ART output branch from the modified NN, leading to the original NN architecture, or by reducing the weight of the ART output but keeping the ART output branch and the associated weights). After training completes, the trained NN is returned (with or without the ART regression output layer stack).

Algorithm 1 below applies unsupervised learning on a training dataset using Auto-Encoders (AE) to generate ARTs prior to generating an ART stack (i.e. a parallel NN layer stack) and adding it to the original NN architecture. The algorithm assumes access to an AE library function that can automatically detect a suitable AE architecture, e.g., using techniques from AutoML. The AEs will create the ARTs for the training data. Provided with input data samples (e.g. an image), AEs attempt to learn to reconstruct the input as closely as possible, i.e. the training output target is the input data. AE architectures are typically described as consisting of an encoding part and a decoding part. The encoding part is a series of NN layers with a decreasing number of neurons per layer, and the decoding part is a series of NN layers with an increasing number of neurons per layer. The last layer of the encoding part is typically the layer with the smallest number of neurons, i.e. the "bottleneck" layer. When training the AE, the AE attempts to minimize the reconstruction error, i.e. the output image closely matches the input image despite having fewer and fewer neurons per layer in the encoding part of the AE—effectively reducing the dimensionality over a series of steps (the different layers of the encoding part) from the original dimensionality of the input to the dimensionality of the bottleneck layer (i.e. the number of neurons of the bottleneck layer). After training is completed, the embodiment runs the AE encoding part for each input data sample and uses the bottleneck layer's corresponding neuron activations as an embedding vector to serve as the ART for the respective data sample. Algorithm 1 then modifies the NN architecture by connecting the ART output layer to the NN's penultimate layer. Then it trains the network for the specified number of Epochs/2. After that, Algorithm 1 removes the ART stack (i.e. the parallel NN layer stack). After that, it removes the ART output and continues training for the remaining Epochs/2 on the NN that again resembles the originally specified NN architecture.

---
Algorithm 1:
---
Input (NN architecture specification, data, targets, Epochs)
Returns trained NN architecture
    ARTs = AutoEncoder(data)
    NNmod = LinearOutput(#neurons = dimensions(ARTs[0]),
    loss = 'mean_absolute_error' )(NN.layers[penultimate])
    NNmod.fit(input=data, output=[targets, ARTs], initial_epoch=1,
    final_epoch=Epochs/2)
    NNmod.layers.pop( )
    NNmod.fit(input=data, output=targets, initial epoch=Epochs/2,
    final_epoch=Epochs)
    Return NNmod Algorithm 2 indicates an exemplary pseudo code algorithm of the invention instantiation for image classification. Algorithm 2 focuses on image classification. It extracts SIFT features from the training images using the well-known opencv library (https://opencv.org/). Algorithm 2 superpositions the features of each image by simple addition to generate an embedding of each image in a feature space. These embeddings represent the ARTs for the training data. Algorithm 2 then modifies the NN architecture by simply connecting the ART output layer to a random NN layer. Then it trains the network for the specified number of Epochs. Algorithm 2 returns the trained modified NN architecture.

Figure 2:
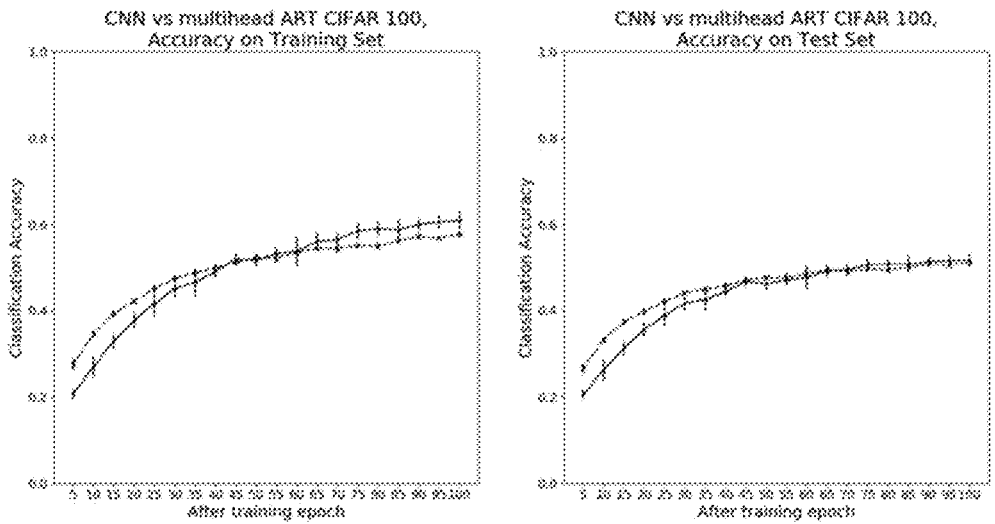
FIG. 2 shows training and validation accuracies on data sets by comparing performance of an original 6 layer NN and a counterpart NN modified according to an embodiment of the invention.
Figure 3:
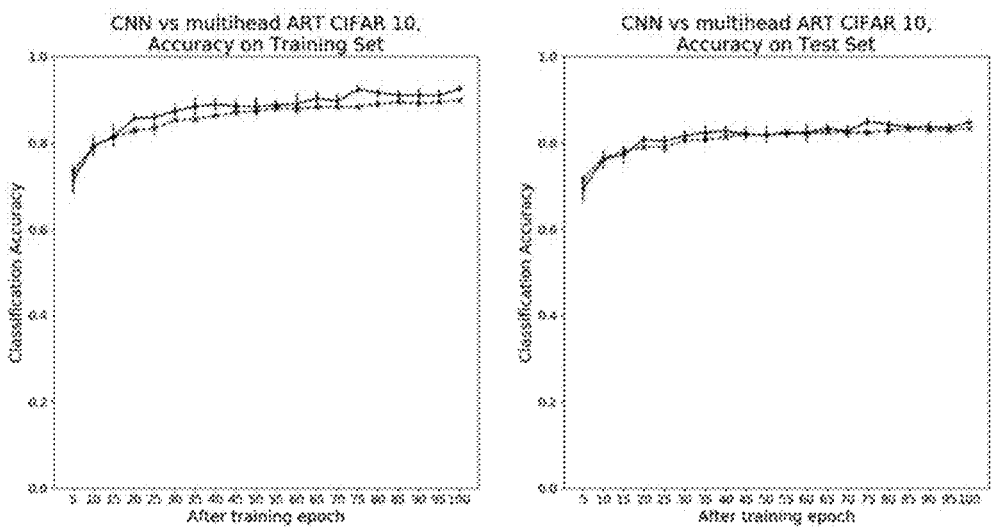
FIG. 3 shows training and validation accuracies on data sets by comparing performance of an original 6 layer NN and a counterpart NN modified according to an embodiment of the invention.

---
Algorithm 2:
---
Input (NN architecture specification, images, labels, Epochs)
Returns trained NN architecture
    For image in images:
        imagesFeature[ ]=opencv.extractSIFT(image)
        ARTs[image] = addAll(imageFeatures)
    NNmod = LinearOutput(#neurons = dimensions(ARTs[0]),
    loss =
    'mean_squared_error' )(NN.layers[randomInt(#NNlayers−1)])
    NNmod.fit(input=images, output=[labels, ARTs], Epochs)
    Return NNmod FIG. 2 and FIG. 3 show the training and validation accuracies on these data sets comparing the performance of an original 6 layer NN and its counterpart as modified according to an embodiment of the invention. Several observations can be made:

For CIFAR 100, the effect of AuxDNN (dashed line) in the early training episodes is much more positive than in the CIFAR 10 case.

Eventually, the original architecture (solid line) catches up and often overtakes AuxDNN. This means that switching off or reducing the ART weights after the initial epochs should be investigated.

The overtaking of the original architecture is particularly evident for the training data, not for the test data. This means that the original architecture is more prone to overfitting than the modified architecture.

The error bars (95% CI of mean accuracy at a given epoch, of 10 different training runs) indicating fluctuations of the results are much smaller for the NN architecture modified by AuxDNN for regressing the ARTs than for the original architecture. This indicates more stable and consistent training behavior.

One or more embodiments support semi-supervised ML learning, i.e. when a mixed set of labeled and unlabeled training data is available, as follows. The AuxDNN starts with using the ML problem-specific library on the unlabeled data. Then, the AuxDNN copies the original NN architecture but removes the classification layer and replaces it by an ART stack. To be explicit: at this point the architecture consists of the original NN architecture's lower layers connected to the layers of the ART stack. After training several iterations on the unlabeled data and reducing the regression error on the unlabeled data to a satisfactory level, the AuxDNN modifies the NN architecture and adds the original classification output layer(s) again. It continues training on the labelled data portion.

In a variation of the semi-supervised embodiment, the AuxDNN may choose add the ART stack to the original NN architecture but keep the originally specified classification output layers. In this variation, the AuxDNN can train on the total dataset (labelled+unlabeled data and the associated ARTs) when requiring that the optimization target function (consisting of a classification error term and an ART regression error term) is parametrized by weights. In this case, the AuxDNN can deactivate the classification error term in the target function for unlabeled data and activate it for labelled data samples.

For example, in the image classification case, the aforementioned opencv library can be used to calculate image descriptors as features. Then, for the "unsupervised" learning phase, the NN is trained to regress these features. Thereafter, a stack of layers for classification is added by AuxDNN as described before and the modified NN architecture is trained on both the classification labels and the ARTs. In the end, AuxDNN may return the modified NN (which classifies images and produces the ARTs when new data is presented to the modified NN), or it removes the unsupervised output stack and returns a single classification NN architecture.

One or more embodiments of the invention can be used for classifying health data such as EEG or ECG data and for predicting equipment condition or breakdown based on sensor data related to the operation of machines (e.g. lifts, engines, production lines, drills). If for these problems no known features or tools exist to construct the ARTs (similar to the case of opencv SIFT/SURF/ORB descriptors), the AuxDNN can resort to, e.g., AutoEncoders to learn the features to be used as ARTs.

In summary, one or more embodiments of the invention provide at least one of the following technical effects:
  The original NN architecture is altered for the purpose of training
  Improved performance during early training epochs can be realized
  Embeddings/feature approximations can optionally be produced for new input data samples as a by-product without the need for a dedicated feature extraction and embedding algorithm when the trained modified NN is in production use.

Furthermore, one or more embodiments of the invention provide at least one of the following advantages:
  Empirical results show that, everything else held fixed, the modified NN reaches higher test set accuracy in early epochs.
  Further, the test set accuracies in early epochs are monotonically increasing, indicating that the ARTs help the learned NN to generalize better than the original NN.

Figure 4:
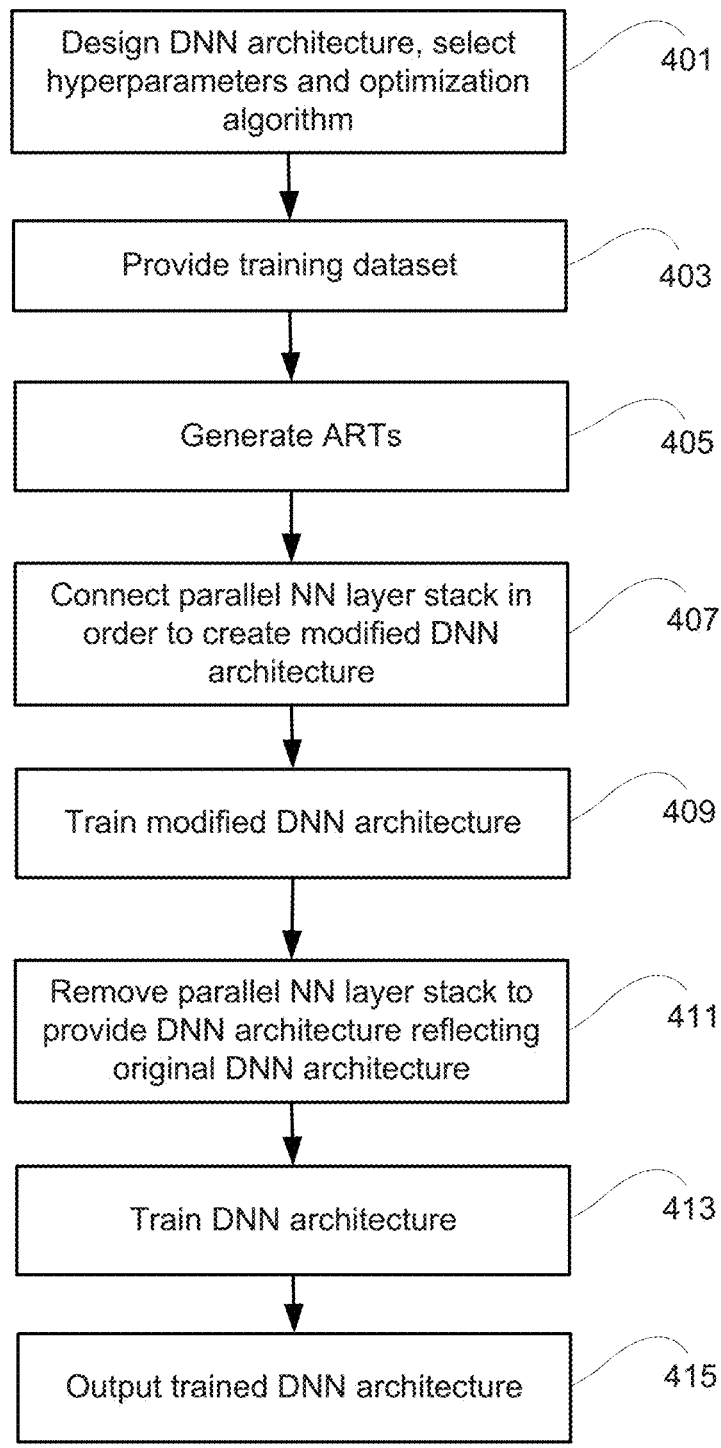
FIG. 4 shows steps of a method for training a DNN according to an embodiment of the invention.

FIG. 4 illustrates a method for using supervised learning to train a deep neural network (DNN) to solve a given problem. At 401, a DNN architecture is designed, hyperparameters and an optimization algorithm for training the architecture to solve the problem are selected, and DNN connection weights are initialized. The DNN architecture can be designed by a human designer or by an algorithm (i.e. an algorithmic designer) and can specify, inter alia, a number of hidden layers, a number of neurons per layer, and connections between neurons of different layers. The hyperparameters can include, inter alia, e.g., a learning rate, a heuristic for initializing DNN connection weights, and a dropout fraction per layer. The optimization algorithm can be, e.g., a gradient descent algorithm such as a stochastic gradient descent.

At 403, a training dataset is provided that includes a plurality of individual input data samples and corresponding targets. For example, for embodiments in which the DNN is being trained to perform image classification, the training dataset includes a plurality of individual images (i.e. the individual input data samples) and, for each image, a class label (i.e. the corresponding targets). At 405, an auxiliary regression target (ART) is generated for each individual input data sample in the training dataset. The ARTs can be generated as described herein above. For example, features of the individual input data samples can be identified and a feature construction process can be performed in order to construct new features and a feature space associated with feature vectors that correspond to the identified and constructed features can be generated. Thereafter, an embedding of each respective individual input data sample in the feature space can be generated and can serve as an ART associated with the respective individual input data sample.

At 407, a parallel NN layer stack is connected to a selected layer of the DNN architecture designed at 401 thereby creating a modified DNN architecture. The parallel NN layer stack is a branch of one or more NN layers that includes an output layer. Therefore, the modified DNN architecture created at 407 includes two output layers: the output layer of the original DNN architecture designed at 401 (i.e. the original output layer) and the output layer of the parallel NN layer stack. The output layer of the parallel NN layer stack can be, e.g., a linear layer having a dimensionality that corresponds to the dimensionality of the ARTs generated at 405. In embodiments where the DNN architecture is being trained to perform image classification, the original output layer is configured, e.g., to generate a class label while the output layer of the parallel NN layer stack is configured to generate a vector having a dimensionality identical to that of a feature space generated from features of the individual input images (or from features of images more generally).

At 409, the modified DNN architecture is trained. During the training at 409, individual input data samples from the training dataset are provided to the modified DNN architecture, the DNN architecture provides output corresponding to a target associated with each input data sample and additional output corresponding to an ART associated with each input data sample (e.g., output in the form of a class label and output in the form of a feature vector), and the weights of the DNN architecture are updated in order to minimize an error function. The weights can be updated after an epoch (in the case of batch training) or after each individual input data sample is considered (in the case of online training). The error function can simultaneously account for a first error between the targets and the output corresponding to the targets and for a second error between the ARTs and the output corresponding to the ARTs. For example, the error function can include a first weight assigned to such a first error and a second weight assigned to such a second error. During the training (e.g. from one epoch to the next or iteratively after a particular number of epochs), the weights assigned to such first and second errors can be adjusted to emphasize the importance of one relative to the other.

At 411, the parallel NN layer stack is removed from the modified DNN architecture in order to provide a DNN architecture reflecting the original DNN architecture designed at 401. At 413, training of the DNN architecture can be continued for one or more epochs during which the ARTs generated at 405 are not considered. At 415, the process returns the trained DNN architecture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for training a machine learning model, the method comprising:
   calculating auxiliary regression targets (ARTs) based on an original training data set;
   modifying an original neural network comprising an original output layer to provide a modified neural network by adding neural network layer stack for regressing the ARTs in parallel with the original output layer such that the modified neural network is configured to produce a first output through the original output layer and a parallel second output through the added stack; and
   training the modified neural network on the ARTs in addition to the original training data set.

2. The method according to claim 1, wherein the training comprises:
   computing a first error based on the first output and the original training data set;
   computing a second error based on the second output and at least one of the ARTs; and
   modifying a weight assigned to a hidden layer of the modified neural network based on the first error and the second error.

3. The method according to claim 2, wherein the original training dataset includes a plurality of individual input data samples and targets associated with the individual input data samples and wherein the hidden layer is upstream of both the original output layer and the added stack.

4. The method according to claim 3, wherein calculating the ARTs for the training data set comprises identifying features of the individual input data samples, generating a feature vector for each of the identified features, constructing a feature space from the generated feature vectors, and generating, for each respective individual input data sample, a corresponding vector in the feature space that serves as an ART associated with the respective individual input data sample.

5. The method according to claim 4, wherein the original neural network provides a first output corresponding to the targets associated with the individual input data samples.

6. The method according to claim 1, wherein training the modified neural network on the ARTs in addition to original machine learning problem targets for the training data set comprises updating weights assigned to the modified neural network so as to minimize an error function based on both the first output and the second output.

7. The method according to claim 6, comprising:
   measuring a first error between the first output produced by the original output layer and a target in the original training data set, and
   measuring a second error between the parallel second output and one of the ARTs;
   training the modified neural network by updating weights assigned to hidden layers of the modified neural network based on both the first error and the second error.

8. The method according to claim 7, wherein the error function includes a first weight applied to the first error and a second weight applied to the second error.

9. The method according to claim 8, wherein training the modified neural network on the ARTs in addition to the original training data set further comprises adjusting the first weight and the second weight.

10. The method according to claim 1, further comprising specifying, for the original neural network, a number of hidden layers, a number of neurons per hidden layer, and/or connections between neurons of different layers.

11. The method according to claim 1, further comprising specifying, for the original neural network, a plurality of hyperparameters that include one or more of a learning rate, a heuristic for initializing neural network connection weights, and a dropout fraction per layer.

12. The method according to claim 3, wherein each of the individual input data samples comprise an images.

13. The method according to claim 12, wherein each of the targets associated with the individual input data samples comprise a class label.

14. A non-transitory computer readable medium storing instructions for causing a processor to perform the method of claim 1.

15. A non-transitory computer readable medium storing instructions for causing a processor to perform the method of claim 2.

* * * * *